US011138035B1

(12) United States Patent
Parulkar et al.

(10) Patent No.: US 11,138,035 B1
(45) Date of Patent: Oct. 5, 2021

(54) MESSAGING BETWEEN DEVICE GROUPS USING A LOGICAL GROUP ADDRESS IN AN ACCESS NETWORK

(71) Applicant: Amazon Technologies, Inc., Seattle, WA (US)

(72) Inventors: Ishwardutt Parulkar, San Francisco, CA (US); Calvin Yue-Ren Kuo, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 36 days.

(21) Appl. No.: 16/138,883

(22) Filed: Sep. 21, 2018

(51) Int. Cl.
*G06F 9/48* (2006.01)
*H04L 29/08* (2006.01)
*G06F 9/455* (2018.01)
*H04L 12/715* (2013.01)

(52) U.S. Cl.
CPC ........ *G06F 9/4856* (2013.01); *G06F 9/45558* (2013.01); *H04L 45/64* (2013.01); *H04L 67/34* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| 10,425,382 | B2* | 9/2019 | Mayya | H04L 63/0281 |
|---|---|---|---|---|
| 2010/0287262 | A1 | 11/2010 | Elzur | |
| 2013/0003697 | A1 | 1/2013 | Adjakple et al. | |
| 2013/0212212 | A1* | 8/2013 | Addepalli | G06F 9/461 |
| | | | | 709/217 |
| 2014/0112203 | A1* | 4/2014 | Rao | H04L 12/6418 |
| | | | | 370/256 |
| 2015/0016404 | A1 | 1/2015 | Rathnam et al. | |
| 2015/0058966 | A1 | 2/2015 | Pourzandi et al. | |
| 2015/0372874 | A1 | 12/2015 | Nuss et al. | |
| 2016/0095041 | A1 | 3/2016 | Agrawal et al. | |
| 2016/0255543 | A1 | 9/2016 | Yadhav et al. | |
| 2018/0205674 | A1 | 7/2018 | Wu et al. | |
| 2019/0373516 | A1* | 12/2019 | Caldenhoven | H04W 36/12 |

OTHER PUBLICATIONS

Nyguyen et al, Session Mobility Solution for Client-Based Application Migration Scenarios, 2011 Eighth International Conference on Wireless On-Demand Network Systems and Services, Jan. 2011, pp. 76-83, IEEE, Italy.

* cited by examiner

Primary Examiner — Ryan D. Coyer
(74) Attorney, Agent, or Firm — Davis Wright Tremaine LLP

(57) ABSTRACT

Technology is described for sending messages between device groups. A message may be generated at a first device group. The first device group may include a plurality of edge devices that is executing a first process. The message may be sent from the first edge device in the first device group to a source controller edge device in the first device group. A logical group address associated with the message may be added. The logical group address may identify a second device group that is to receive the message. The second device group may include a plurality of edge devices that is executing a second process. The message may be sent from the source controller edge device in the first device group to a destination controller edge device in the second device group over an overlay grouping network between the first device group and the second device group.

20 Claims, 14 Drawing Sheets

MESSAGING BETWEEN DEVICE GROUPS USING A LOGICAL GROUP ADDRESS IN AN ACCESS NETWORK

BACKGROUND

Emerging classes of applications as well as classes of applications that are deployed today may benefit from being hosted at edge devices of a computing service provider's network in order to provide closer proximity of the computing services to end users, as opposed to accessing computing services at service provider environment that is more distant geographically or takes longer to access due to network latency. The processing of data at the edge devices may be more efficient or faster for certain use cases as compared to sending the data to the service provider environment for processing.

The hosting of applications at edge devices may be beneficial when end users have unreliable connectivity or a lack of connectivity with the service provider environment. In addition, the hosting of applications at edge devices may provide reduced latency, free up backhaul bandwidth to the service provider environment, provide data sovereignty for the owners of distributed applications, and provide cost savings when compared to using resources in the service provider environment.

Non-limiting examples of applications that may run on edge devices may include video analytics applications, autonomous vehicle applications, video caching and processing applications, augmented reality (AR)/virtual reality (VR) applications, online gaming applications, etc.

DETAILED DESCRIPTION

Figure 1:
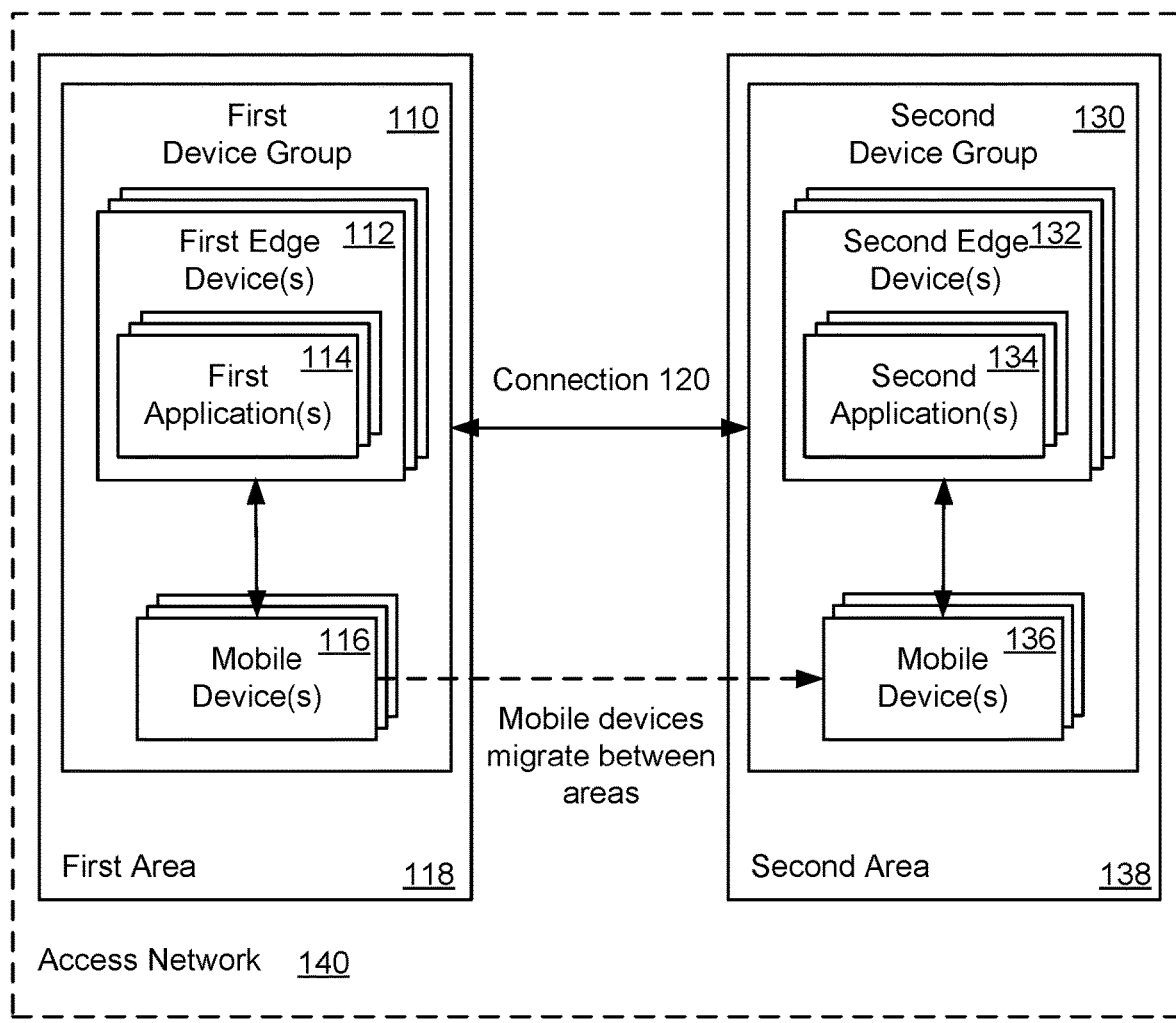
FIG. 1 illustrates a system that includes device groups of edge devices that are in communication with mobile devices in an access network according to an example of the present technology.

A technology is described for executing applications (or program code functions or processes) on edge devices in an access network on behalf of mobile devices that are connected to the edge devices. The applications may be hosted on the edge devices (e.g., with base stations, wireless access points, network hubs, traffic aggregation points) in the access network to support the wireless and/or mobile nature of the mobile devices. For example, the devices in the network may include connected or autonomous vehicles. The edge devices that run the applications may support various capabilities, such as compute services, messaging services, data caching, data syncing, machine learning, etc. The access network may use various network technologies, such as cellular, wireless, fiber optics, wires, microwaves, etc. to connect the mobile devices with a service provider environment (e.g., a data center). In this example, the applications may be executed at the edge devices to be physically closer to end users (as opposed to the execution of applications at the service provider environment) and/or to decrease round trip network communication time, which may be useful for reducing latency and providing data sovereignty.

In one configuration, mobile devices may maintain session continuity with applications executing on the edge devices in the presence of mobility (e.g., when the mobile devices migrate between edge devices). For example, an application may be executed at a first edge device and may be used by a mobile device that is connected to the first edge device. The first edge device may establish a connection with a second edge device. The first edge device may determine that the mobile device has been handed over from the first edge device to the second edge device when the mobile device is registered as being transferred to the second edge device by the mobile communication network. In this configuration, the application may not move from the first edge device and may continue to execute on the first edge device when the mobile device has been handed over from the first edge device to the second edge device. In one example, the first edge device may receive a message with session information and device data from the mobile device via the connection with the second edge device when the mobile device has been handed over from the first edge device to the second edge device. The connection may maintain a session between the application executing on the first edge device and the mobile device while the mobile device is connected to the second edge device. An application session may be maintained during handover of the mobile device by replicating and/or migrating a session state from the first edge device to the second edge device. The first edge device may generate an output from the application executing on the first edge device using the device data received from the mobile device. The first edge device may send a reply message with the output from the first edge device to the mobile device via the connection with the second edge device. As a result, the mobile device may communicate with the application executing on the first edge device via the second edge device, even after the mobile device has been handed over from the first edge device to the second edge device.

In one configuration, applications may be migrated between edge devices based on device mobility (e.g., when the mobile devices migrate between edge devices). For example, a first edge device may determine to migrate an application executing on the first edge device to a second edge device when the mobile device has been handed over from the first edge device to the second edge device. In this example, migrating the application with the mobile device may be more efficient than continuing to run the application at the first edge device and/or making a copy of the application at the second edge device. Based on this goal, the first edge device may verify that the second edge device satisfies a defined hardware capability, a defined bandwidth constraint and/or a defined network latency characteristic for running the application. The first edge device may provide the application to the second edge device via a connection between the first edge device and the second edge device. The connection may include a bridge device that relays messages between the first edge device and the second edge device. Further, the connection may be a virtual private network (VPN) connection between the first edge device and the second edge device. After the application has moved to the second edge device, the application may begin executing on the second edge device. The mobile device may communicate with the application that is executing on the second edge device. At this point, the mobile device may cease communication with the first edge device.

In one configuration, edge devices may include applications for multiple tenants or customers, as well as virtual network functions (VNFs), and the applications and the VNFs may be hosted at the edge devices using Kernel-based Virtual Machines (KVMs) to ensure sufficient isolation of data stored in memory for the applications. The first edge device may use a KVM-based worker manager to generate KVM(s) to run application(s) and VNFs for multiple tenants at the first edge device, and the KVM(s) may provide a separate memory space for the application(s) and the VNFs for the multiple tenants. For example, one KVM may be generated per application or tenant at the first edge device. The KVM may provide a defined level of isolation and data privacy between each of the multiple tenants or the applications that are using the first edge device. In one example, an application running on a first KVM of the first edge device may be migrated to a second KVM of the second edge device when the mobile device has been handed over from the first edge device to the second edge device.

In one configuration, applications may be executing on edge devices that are included in device groups, and the device groups may communicate messages between each other using a logical group address over a grouping overlay network. The grouping overlay network may overlay a defined network topology that is used to connect the device groups. For example, a first application may be executed on a first edge device that is included in a plurality of edge devices in a first device group. A message may be generated at the first application executing on the first edge device. The message may be sent from the first edge device to a source controller edge device in the first device group. A logical group address may be identified that is associated with the message at the source controller edge device in the first device group. The logical group address may identify a second device group that is part of a plurality of edge devices including a second edge device executing a second application that is to receive the message. The message may be sent from the source controller edge device in the first device group to a destination controller edge device in the second device group over the grouping overlay network. The message may be directed from the destination controller edge device in the second device group to the second application executing on the second edge device included in the second device group using the logical group address. In this example, the first application and the second application may be separate applications across edge devices or separate instances of a same type of distributed application.

FIG. 1 illustrates an exemplary system that includes device groups 110, 130 with edge devices 112, 132 that are in communication with mobile devices 116, 136 in an access network 140. The access network 140 may include a first device group 110 and a second device group 130. The first device group 110 may include first edge device(s) 112 and mobile device(s) 116 that are associated with a first area 118. The second device group 130 may include second edge device(s) 132 and mobile device(s) 136 that are associated with a second area 138. The mobile device(s) 116 may be connected to the first edge device(s) 112 and the mobile device(s) 136 may be connected to the second edge device(s) 132. The first edge device(s) 112 may execute the first application(s) 114 and the second edge device(s) 132 may execute the second application(s) 134. The first device group 110 may communicate with the second device group 130 via a connection 120 between the first device group 110 and the second device group 130.

In one example, as described in further detail below, the mobile device(s) 116 may migrate from connecting to the first edge device(s) 112 to connecting to the second edge device(s) 132 when the mobile device(s) 116 migrate from the first area 118 to the second area 138, but the mobile device(s) 116 may maintain connectivity and/or a session with the first application(s) 114 executing on the first edge device(s) 112 after the mobile device(s) are connected to the second edge device(s) 132. In another example, as described in further detail below, the first application(s) 114 executing on the first edge device(s) 112 may be migrated to the second edge device(s) 132 over the connection 120 when the mobile device(s) 116 migrate from the first area 118 to the second area 138.

In one example, as described in further detail below, the first application(s) 114 executing on the first edge device(s) 112 and the second application(s) executing on the second edge device(s) 132 may include applications for multiple tenants or customers, as well as virtual network functions (VNFs), and the applications and the VNFs may be hosted at the first and second edge device(s) 112, 132 using Kernel-based Virtual Machines (KVMs) to ensure sufficient isolation of data stored in memory for the applications and the VNFs.

In another example, as described in further detail below, the first device group 110 may communicate messages with the second device group 130 using a logical group address that identifies a recipient of the messages. For example, the first application(s) 114 of the first device group 110 may send messages to the second application(s) 134 of the second device group 130 using a logical group address that identifies the second device group 130 as the recipient of the messages, and the messages may be directed to the second application(s) 134 executing on the second edge device(s) 132 of the second device group 130.

Figure 2:
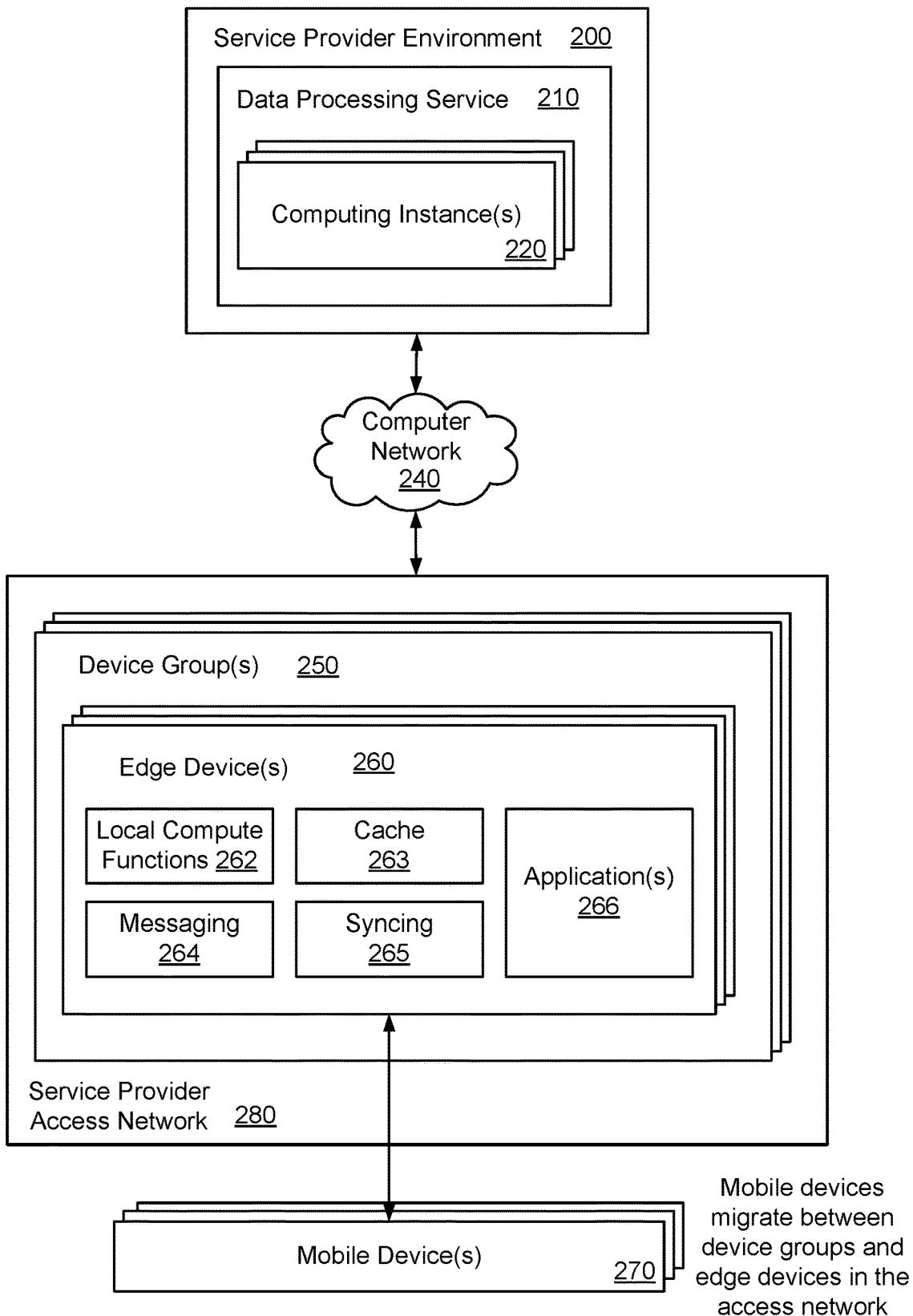
FIG. 2 is an illustration of a networked system that includes device groups of edge devices in an access network that are in communication with a data processing service in a service provider environment according to an example of the present technology.

FIG. 2 illustrates example components of the present technology. A service provider environment 200 may operate a data processing service 210 using one or more computing instances 220. The service provider environment 200 may communicate with device group(s) 250 in a service provider access network 280 via a computer network 240. The device group(s) 250 may communicate with each other via a connection between the device group(s) 250 in the service provider access network 280. The device group(s) 250 may include edge device(s) 260 that are communicating with mobile device(s) 270. The mobile device(s) 270 may migrate between the device group(s) 250 and the edge device(s) 260 in the service provider access network 280 over a period of time. The edge device(s) 260 may also be referred to as computing nodes or communication hubs. The edge device(s) 260 may provide an entry point into enterprise or service provider core networks. The edge device(s) 260 may include a base station, a wireless gateway, a router, a network hub, a traffic aggregation device, a central office and/or a wireless access point to the internet, other networks, and/or a distributed computing power of the service provider environment 200.

In one example, the service provider access network 280 may be a network that is used to connect the mobile devices 270 to the service provider environment 200. The service provider access network 280 may use various network technologies, such as a cellular network (e.g., Third Generation (3G), Fourth Generation (4G) or Fifth Generation (5G) network), wired local area network (LAN) or cable networks (e.g., Ethernet or Data Over Cable Service Interface Specification (DOCSIS)), wireless LAN (e.g., WiFi or 802.11xx), fiber optic network (e.g., fiber to the home (FTTH)), Ethernet, wireless local area network (WLAN), fiber optic, Digital Subscriber Line (DSL) (e.g., Asymmetric Digital Subscriber Line (ADSL)), etc. The service provider access network 280 may be connected via fiber transport networks to the service provider environment 200 (or to a service provider backend system in a data center).

In one example, the edge device(s) 260 may host application(s) 266 for the mobile device(s) 270. Non-limiting examples of the application(s) 266 may include video analytics applications, connected and autonomous vehicle applications, video caching and processing applications, augmented reality (AR)/virtual reality (VR) applications, online gaming applications, etc.

In one configuration, the edge device 260 may include local compute functions 262, which may be instructions for execution at the edge device 260. The local compute functions 262 may be similar to compute code functions that may be executed in a compute service in the service provider environment 200, but these functions may be available to execute at the mobile device 270 without accessing the service provider environment 200. For example, containers and/or computing instances may be provided in the edge device 260, and the local compute functions 262 or compute code functions may be executed or launched using a local compute service in the edge device 260. The local compute functions 262 or compute code functions may be portions of code that may be executed using the local compute service at a request of the mobile devices 270, and return results may be provided to the mobile devices 270. The local compute functions 262 may be functions that launch in a container (e.g., on a computing instance) of the edge device 260 and are segments of program code that are capable of receiving parameters, performing processing, and returning values. In addition, the local compute functions 262 may be terminated at the edge device 260 once the local compute codes return values.

In one example, the edge device 260 may further include a cache 263 for storing device reporting data or state data from the mobile devices 270 while the service provider environment 200 is inaccessible. When the service provider environment 200 becomes accessible again, the device data or state data may be uploaded from the cache 263 to the service provider environment 200. In another example, the edge device 260 may further include messaging services 264 for providing messaging between the mobile devices 270. In yet another example, the edge device 260 may further include a syncing service 264 that is used to sync data and device states from the mobile devices 270 to shadow device states in the service provider environment 200. More specifically, the edge device 260 may cache the state of the mobile devices 270, using a virtual version, or "shadow," of each mobile device 270, which tracks the device's current versus a desired state. These localized shadow states may be synchronized with shadow states in the service provider environment 200.

The mobile devices 270 may be, for example, processor-based systems or embedded systems. The mobile devices 270 may include, but are not limited to, moveable devices, such as laptops or notebook computers, tablet computers, handheld computers, or other devices with like capability. In another example, the mobile devices 270 may include Internet of Things (IoT) devices that are connectable to the internet. In yet another example, the mobile devices 270 may include connected vehicles or autonomous vehicles.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), a virtualized storage network, volatile or non-volatile RAM, optical media, or hard-drive type media. The data store may be representative of a plurality of data stores as can be appreciated.

The computer network 240 may include any useful computing network, including an intranet, the Internet, a localized network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be a centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
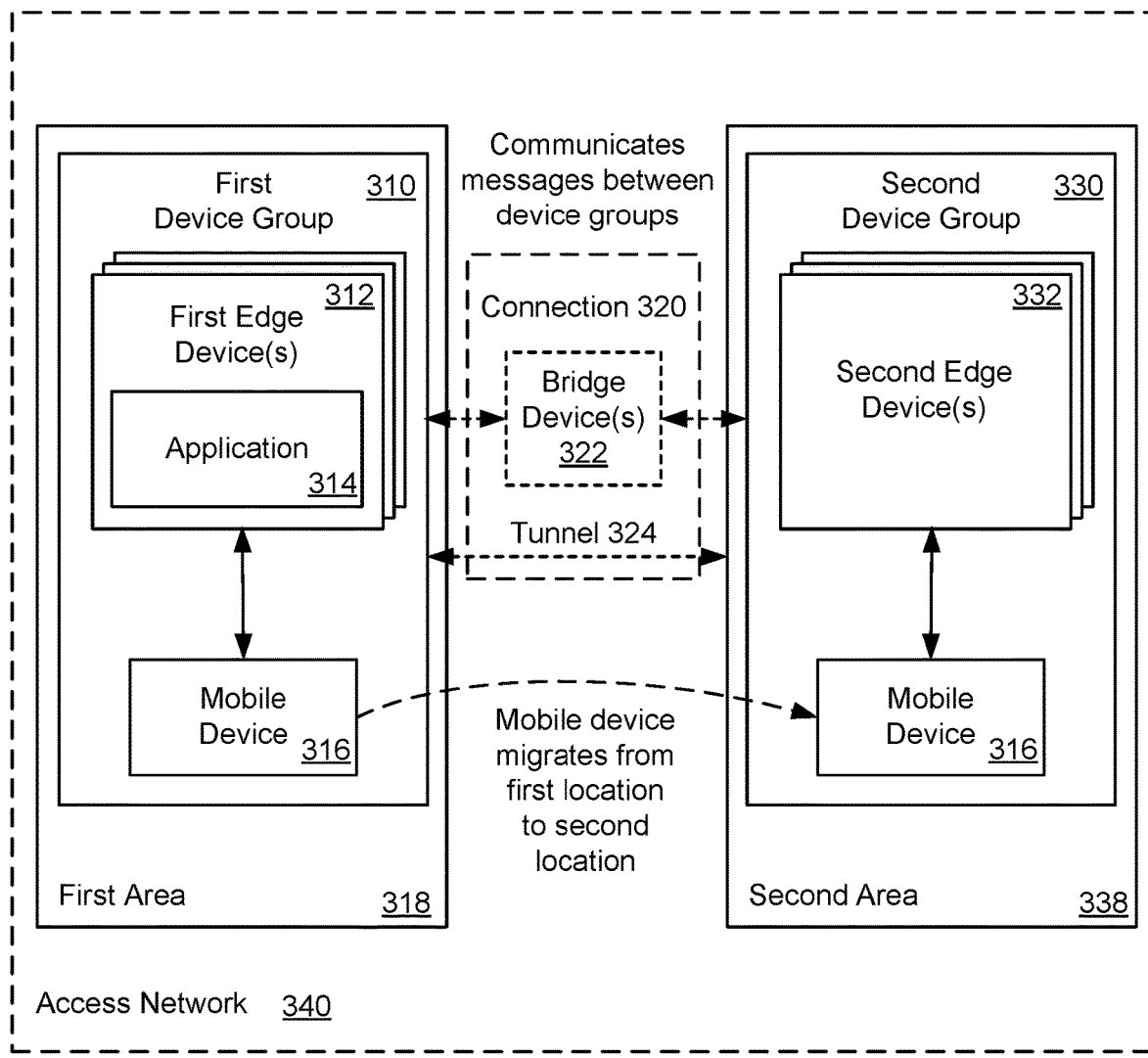
FIG. 3 illustrates a system and related operations for migrating a mobile device from a first edge device to a second edge device and maintaining connectivity between the mobile device and the first edge device according to an example of the present technology.

FIG. 3 illustrates an exemplary system and related operations for migrating a mobile device 316 from a first edge device 312 to a second edge device 332 and maintaining connectivity between the mobile device 316 and an application 314 (e.g., program code, executable code, or process) executing on the first edge device 312. The first edge device 312 may maintain or reestablish application session continuity with the mobile device 316 after the mobile device 316 has moved between a first edge device and a second edge device. For example, the application session may be maintained or reestablished when the mobile device 316 migrates from the first edge device 312 associated with a first area 318 to the second edge device 332 associated with a second area 338 in an access network 340. The first edge device 312 may be included in a first device group 310 and the second edge device 332 may be included in a second device group 330. In addition, the application 314 executing on the first edge device 312 may be stateless or stateful.

In one example, the first device group 310 may operate independently from the second device group 330. However, a connection 320 may exist between the first device group 310 and the second device group 330 that functions to relay messages between the first device group 310 and the second device group 330, thereby allowing the application 314 executing on the first edge device 312 to maintain session continuity with the mobile device 316, even after the mobile device 316 has been handed over from the first edge device 312 to the second edge device 332. The connection 320 between the first device group 310 and the second device group 330 may connect the first edge device 312 with the second edge device 332. In one example, the connection 320 between the first device group 310 and the second device group 330 may include bridge device(s) 322. The bridge device 322 may function as an intermediary that relays messages between the first edge device 312 and the second edge device 332. The bridge device(s) 322 may include routers, repeaters or other intermediary network devices that serve to relay messages between the first edge device 312 and the second edge device 332. Alternatively, the connection 320 between the first device group 310 and the second device group 330 may include a tunnel 324 (e.g., a virtual private network (VPN) tunnel) that relays messages between the first edge device 312 and the second edge device 332.

In one configuration, the first edge device 312 may execute the application 314 for the mobile device 316 that is connected to the first edge device 312. At a point in time, the mobile device 316 that is connected to the first edge device 312 in the first area 318 may move to the second area 338, and may thereafter connect to the second edge device 332 in the second area 338 and disconnect from the first edge device 312. However, it may be desirable for the mobile device 316 to continue a session with the application 314 executing on the first edge device 312, even after the first edge device 312 connects to the second edge device 332. In this example, the connection 320 between the first device group 310 and the second device group 330 may be useful in maintaining connectivity between the application 314 executing on the first edge device 312 and the mobile device 316 when the mobile device 316 is connected to the second edge device 332, as the connection 320 may be used to relay messages between the first edge device 312 and the second edge device 332. When the first edge device 312 determines that the mobile device 316 has been handed over from the first edge device 312 to a second edge device 332, messages may be communicated between the application 314 executing on the first edge device 312 and the mobile device 316 via the connection 320. As a result, connectivity may be maintained between the application 314 executing on the first edge device 312 and the mobile device 316 after the mobile device 316 has been handed over to the second edge device 332. In this example, the application 314 may not move and may continue to execute on the first edge device 312 when the mobile device 316 has been handed over to the second edge device 332.

In one example, after the mobile device 316 has been handed over to the second edge device 332, the mobile device 316 may send session information and device data to the second edge device 332 via a session that is maintained between the mobile device 316 and the application 314 executing on the first edge device 312. The second edge device 332 may send a message including the device data to the first edge device 312 over the connection 320 between the first device group 310 and the second device group 330 when the mobile device 316 has been handed over from the first edge device 312 to the second edge device 332, where the connection 320 and the session information may maintain connectivity and/or a session between the application 314 executing on the first edge device 312 and the mobile device 316 while the mobile device 316 is connected to the second edge device 332. The first edge device 312 may provide the device data to the application 314 executing on the first edge device 312. The application 314 may generate an output using the device data received from the mobile device 316 via the second edge device 332. The first edge device 312 may send a reply message including the output to the second edge device 332 over the connection 320 between the first device group 310 and the second device group 330. The second edge device 332 may forward the reply message including the output to the mobile device 316. As a result, the mobile device 316 may maintain connectivity and/or a session with the application 314 executing on the first edge device 312 after the mobile device 316 has been handed over to the second edge device 332. Rather than maintaining a direct connection with the application 314, the mobile device 316 may be connected to the application 314 via the second edge device 332.

In one example, messages communicated between the first edge device 312 and the second edge device 332 via the connection 320 may include Message Queuing Telemetry (MQTT) messages, which uses a publish-subscribe-based messaging protocol. For example, device data may be encapsulated as MQTT messages that are communicated between the first edge device 312 and the second edge device 332. In another example, messages communicated between the first edge device 312 and the second edge device 332 via the connection 320 may be Internet Protocol (IP) messages, Real Time Streaming Protocol (RTSP) messages, user datagram protocol (UDP) messages, etc., which may allow encapsulated data to flow between the first edge device 312 and the second edge device 332.

In one example, the first edge device 312 and the second edge device 332 may include a base station for a cellular network, a wireless access point, a network hub, a traffic aggregation device and/or a central office. The first edge device 312 and the second edge device 332 may be fixed or immobile devices in the access network 140, whereas the mobile device(s) 116, 136 move within the access network 140 and between multiple access networks.

Non-limiting examples of the application 314 running on the first edge device 312 may include video analytics applications, connected and autonomous vehicle applications, video caching and processing applications, augmented reality (AR)/virtual reality (VR) applications, online gaming applications, etc. In a specific example, the application 314 may be an Internet-connected vehicle application or autonomous vehicle application, and the mobile device 316 may be a connected or autonomous vehicle that is moving from the first edge device 312 in the first area 318 to the second edge device 332 in the second area 338, but may maintain connectivity and/or a session with the connected or autonomous vehicle application after moving to the second edge device 332 in the second area 338.

As a non-limiting example, the mobile device 316 may be attached to a specific radio base station or a WiFi access point that is executing an application, but the mobile device 316 may move and attach to another radio base station or WiFi access point. The mobile device 316 may maintain connectivity and/or a session with the application running on the radio base station or the WiFi access point, even when the mobile device 316 moves from one radio base station or WiFi access point to another radio base station or WiFi access point. In another example, the mobile device 316 may move to a separate access point connected to a same radio base station, or the mobile device 316 may move to a different access point connected to a new radio base station as compared to an original radio base station that hosts the application.

In one example, the establishment of the connection 320 between the first device group 310 and the second device group 330 for the relay of messages between the first device group 310 and the second device group 330 may be built on an existing cellular handover mechanism for handing over a mobile device 316 from a first radio base station to a second radio base station. In other words, after the first radio base station determines to hand over the mobile device 316 to the second radio base station using the existing cellular handover mechanism (e.g., when a radio signal power level between the first radio base station and the mobile device 316 is below a defined threshold), the first radio base station may determine to begin sending messages over the connection 320 to the second radio base station to maintain application session continuity with the mobile device 316.

In a non-limiting example, the application 314 may be a retail application that is executing on a first wireless access point in a retail store. A customer holding the mobile device 316 may be walking around the retail store and pass a boundary and move from the first wireless access point in the retail store to a second wireless access point in the retail store. In this example, device data from the mobile device 316 may be transmitted to the second wireless access, and the device data may be forwarded to the first wireless access point. The device data may be inputted to the retail application that is executing on the first wireless access point.

Figure 4:
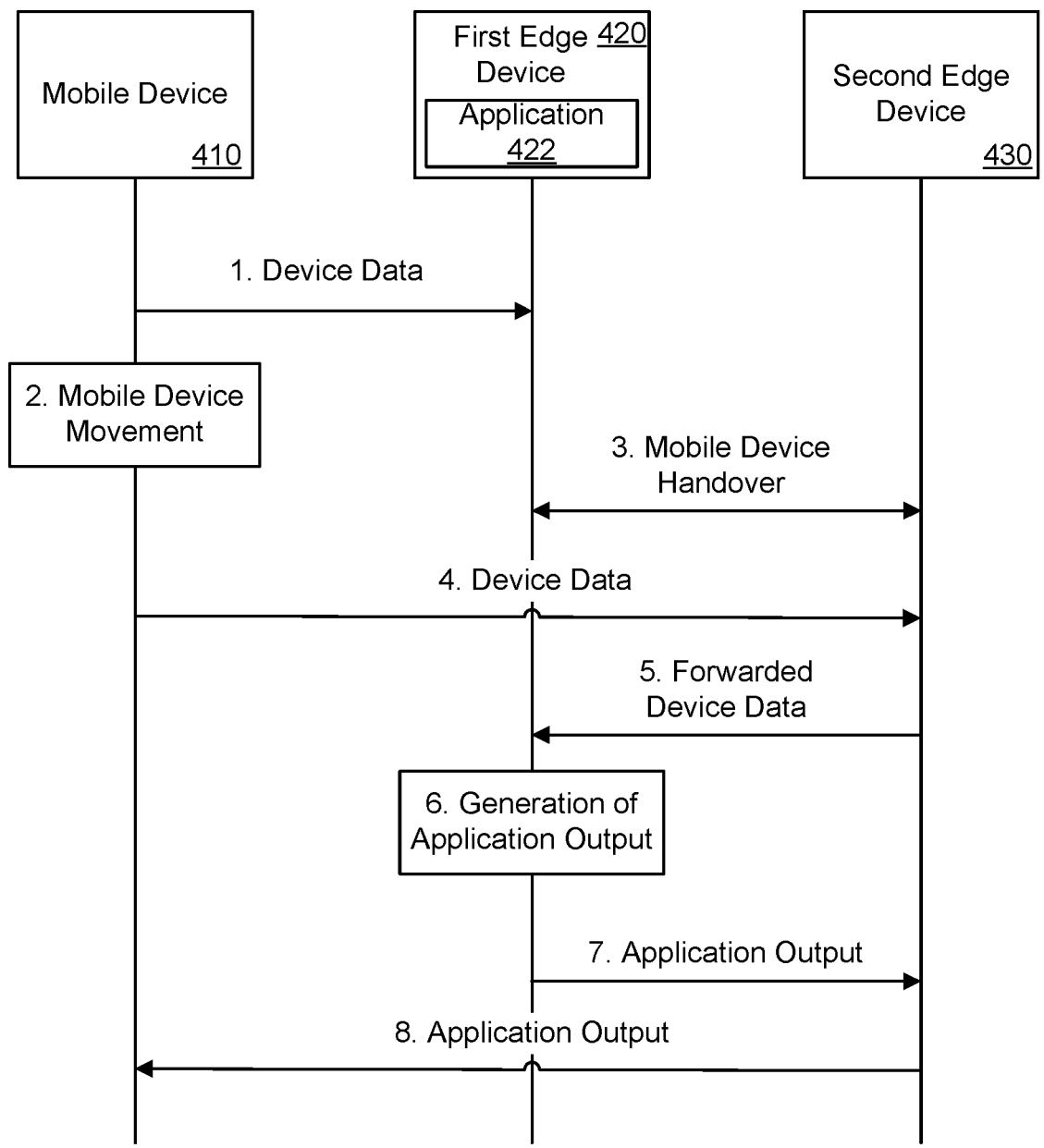
FIG. 4 illustrates a system and related operations for migrating a mobile device from a first edge device to a second edge device and communicating messages between the mobile device and the first edge device via the second edge device according to an example of the present technology.

FIG. 4 illustrates an exemplary system and related operations for migrating a mobile device 410 from a first edge device 420 to a second edge device 430 and communicating messages between the mobile device 410 and an application 422 executing on the first edge device 420 via the second edge device 430. In a first step, the mobile device 410 may be connected to the application 422 executing on behalf of the mobile device 410 at the first edge device 420, and the mobile device 410 may send session information and device data to the first edge device 420. In a second step, the mobile device 410 may move from an area of the first edge device 420 to an area of the second edge device 430. In a third step, the first edge device 420 may determine, due to the movement of the mobile device 410 to the area of the second edge device 430, to hand over the mobile device 410 from the first edge device 420 to the second edge device 430. The first edge device 420 may exchange appropriate signaling with the second edge device 430 to hand over the mobile device 410 to the second edge device 430. In a fourth step, after the handover is complete, the mobile device 410 may send device data to the second edge device 430 while bypassing the first edge device 420. However, since the application 422 is continuing to execute at the first edge device 420 on behalf of the mobile device 410, in a fifth step, the second edge device 430 may forward the device data received from the mobile device 410 to the first edge device 420. The second edge device 430 may be instructed to forward device data received from the mobile device 410 to the first edge device 420 when the first edge device 420 and the second edge device 430 exchange the appropriate signaling to hand over the mobile device 410 to the second edge device 430. In a sixth step, the application 422 executing on the first edge device 420 may generate an output based on the session information and/or the device data received from the mobile device 410 via the second edge device 430. In a seventh step, the first edge device 420 may send the output to the second edge device 430, and in an eighth step, the second edge device 430 may forward the output to the mobile device 410. As a result, the mobile device 410 may maintain a connection (e.g., application session continuity) with the application 422 executing at the first edge device 420 via the second edge device 430.

Figure 5:
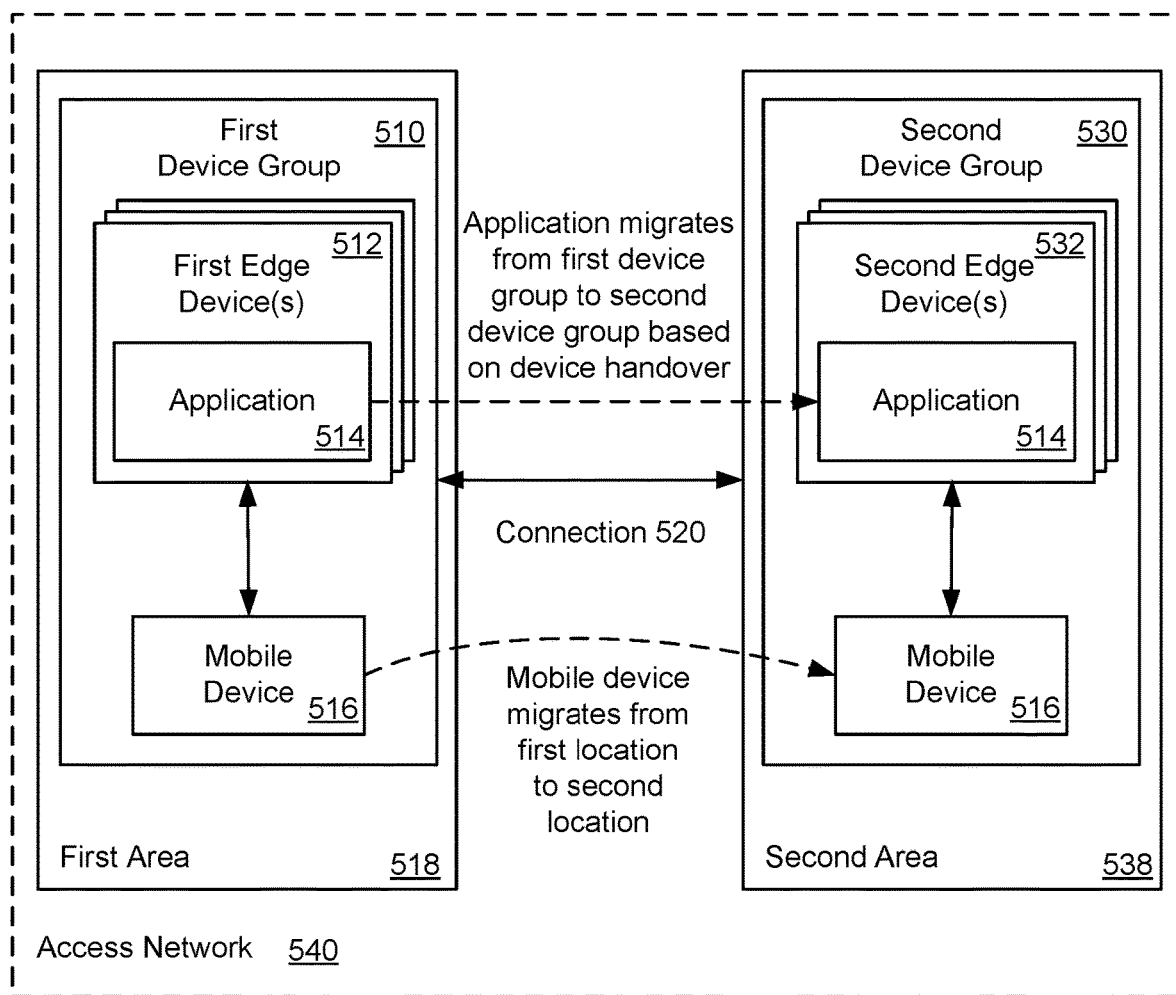
FIG. 5 illustrates a system and related operations for migrating an application from a first edge device to a second edge device when a mobile device has been handed over from the first edge device to the second edge device according to an example of the present technology.

FIG. 5 illustrates an exemplary system and related operations for migrating an application 514 from a first edge device 512 to a second edge device 532 in an access network 540 when a mobile device 516 has been handed over from the first edge device 512 to the second edge device 532. The application 514 may be migrated across edge devices in the access network. For example, the application 514 may be migrated from the first edge device 512 in a first area 518 to the second edge device 532 in a second area 538, where the first edge device 512 may be included in a first device group 510 and the second edge device 532 may be included in a second device group 530.

In one example, the mobile device 516 may move from the first area 518 to the second area 538, and the mobile device 516 may be handed over from the first edge device 512 to the second edge device 532. In this example, the first edge device 512 may also determine to migrate the application 514 executing on the first edge device 512 to the second edge device 532 after the mobile device 516 has been handed over to the second edge device 532. In other words, the handover of the mobile device 516 may trigger the migration of the application 514. The migration of the application 514 may be more efficient than continuing to run the application 514 at the first edge device 512 and/or making a copy of the application 514 at the second edge device 532. The first edge device 512 may send the application 514 to the second edge device 532 over a connection 520 between the first device group 510 and the second device group 530. The connection 520 may include a bridge device that connects the first device group 510 with the second device group 530, or alternatively, the connection 520 may be a VPN connection that enables the first edge device 512 to send the application 514 to the second edge device 532. After the migration of the application 514, the application 514 may begin executing on the second edge device 532, and the application 514 may communicate with the mobile device 516 that is connected to the second edge device 532. At this point, the mobile device 516 may cease communication with the first edge device 512.

In one example, the application 514 may cease operation (e.g., the application 514 may be frozen using a utility such as a Checkpoint/Restore in Userspace (CRIU)) prior to its migration to the second edge device 532. The application 514 may be migrated to the second edge device 532, and then the application 514 may resume operation (e.g., the application 514 may be unfrozen and restored) on behalf of the mobile device 516 the second edge device 532.

In one example, moving the application 514 to the second edge device 532 after the mobile device 516 connects to the second edge device 532 may be more efficient than running multiple copies of the application 514 at the same time in the access network 540 (e.g., running the application 514 in both the first edge device 512 and the second edge device 532 at the same time). In the past, the application 514 would be pre-deployed on both the first edge device 512 and the second edge device 532, but this past approach was less efficient due to increased memory consumption. Here, the application 514 may be moved along with the mobile device 516 and does not unnecessarily execute on an edge device that is not connected to the mobile device 516.

In one example, the compute/storage capabilities of edge devices in the access network 540 can vary depending on a specific hardware configuration of the edge devices. For example, the compute/storage capabilities available can vary from one processor in an edge device with a few gigabytes of memory to several rack servers which may be available. The edge devices may also vary in terms of processing power, memory, network latency, and a number of end devices that can be served by the edge devices. Therefore, the first edge device 512 may verify that the second edge device 532 satisfies a defined hardware capability, a defined bandwidth constraint/characteristic and/or a defined network latency characteristic for running the application 514 prior to moving the application 514 to the second edge device 532.

In one example, in addition to the movement of the mobile device 516 from the first edge device 512 to the second edge device 532, the first edge device 512 may determine to migrate the application 514 based on a performance level of the application 514, a resource utilization of the application 514, a cost of migrating the application 514 or a service level agreement (SLA). For example, the first edge device 512 may determine that not moving the application 514 to the second edge device 532 will cause the performance level of the application 514 to be less than a defined threshold or the SLA to not be met. In another example, the first edge device 512 may perform an efficiency calculation to compare immediately moving the application 514 or finishing execution of functions prior to transfer of the application 514, and if a cost of immediately moving the application 514 is higher than finishing the execution of the functions locally, then the first edge device 512 may wait to move the application 514 to the second edge device 532.

Figure 6:
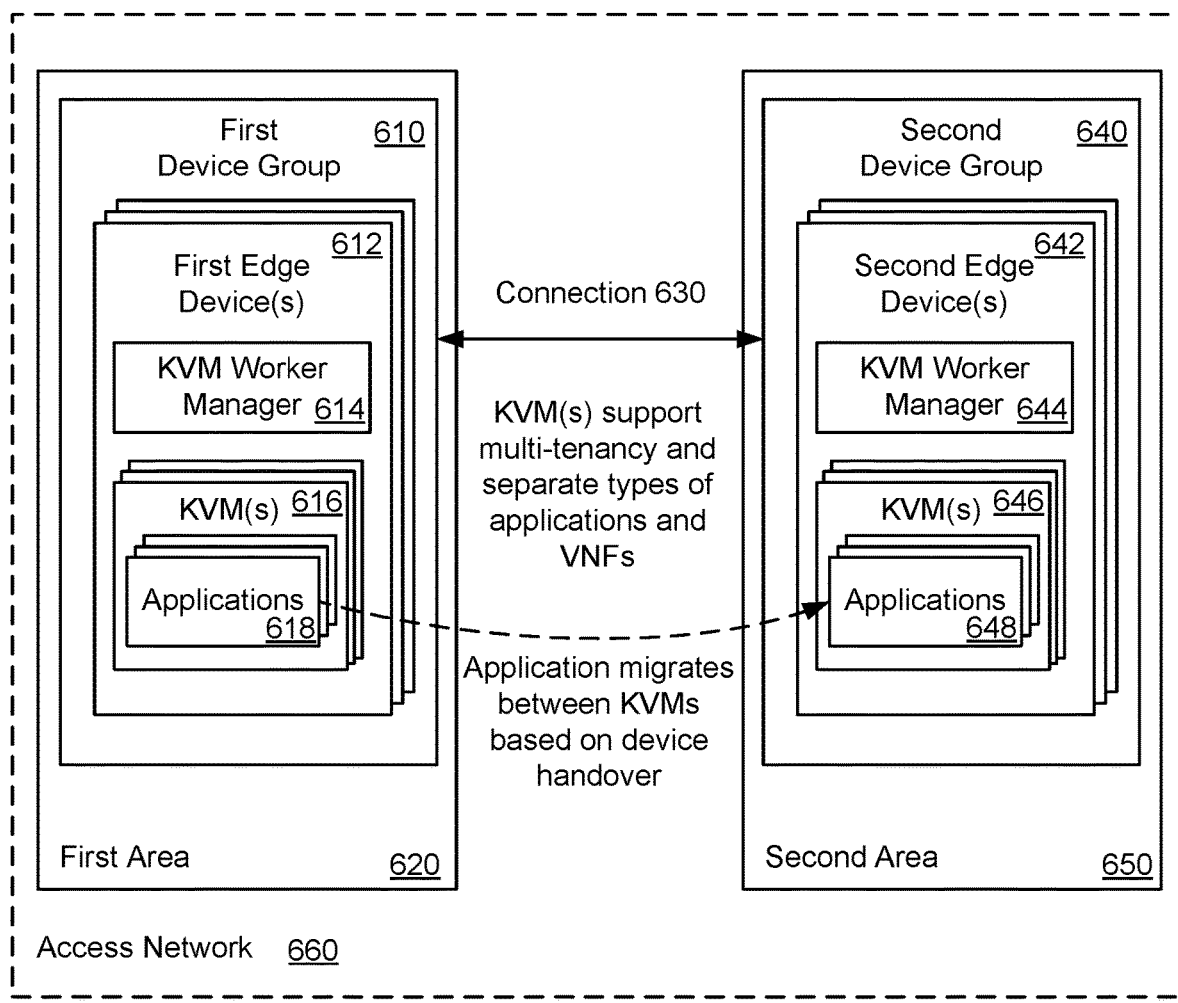
FIG. 6 illustrates a system and related operations for using kernel-based virtual machines (KVMs) to support multi-tenancy and disparate types of applications according to an example of the present technology.

FIG. 6 illustrates an exemplary system and related operations for using kernel-based virtual machines (KVMs) to support multi-tenancy and disparate types of applications in an access network 660. The access network 660 may include a first edge device 612 in a first area 620 and a second edge device 642 in a second area 650, and the first edge device 612 may be included in a first device group 610 and the second edge device 642 may be included in a second device group 640.

The first edge device 612 and the second edge device 642 may include general purpose hardware that hosts multiple types of application(s) 618, 648. For example, the application(s) 618, 648 may include third party applications, which may be developed and managed for separate tenants or customers. In addition, the first edge device 612 and the second edge device 642 may include general purpose hardware that hosts virtual network functions (VNFs). The third party applications may be applications for autonomous cars, video surveillance, smart meters, etc., and the third party applications may be run for separate customers. For example, the third party applications may include disparate applications that are being run by different car companies, or a connected car application and a video surveillance application. The VNFs may be software implementations of network functions that are deployed on a network function virtualization infrastructure. The network functions can be run on software and virtualized on general purpose racks and servers, as opposed to specialized networking hardware. The VNFs may be owned and managed by a network operator in the access network 660.

In one example, hosting multiple types of applications 618, 648 (as well as VNFs) for separate tenants or customers on the same first and second edge devices 612, 642 in a multi-tenancy (or multi-customer) manner may potentially cause issues in terms of data isolation, data privacy, data security, resource availability guarantees, etc. Therefore, in one example, KVMs 616, 646 in the first and second edge devices 612, 642 may be used to run the applications 618, 648 for the multiple customers. The KVMs 616, 646 may function as a virtual machine that provides a separate memory space (as opposed to a shared memory space) for different types of applications 618, 648 or for separate customers that are running applications 618, 648 on the first and second edge devices 612, 642. In the past, multiple applications for different customers would share a same memory space, and applications for one customer would sometimes conflict with applications for another customer due to the usage of the same memory space. From a resource utilization perspective, the usage of the KVMs 616, 646 may limit a number of tenants (or customers) that can be supported, but may provide sufficient isolation for each tenant.

In one example, the KVMs 616, 646 may be allocated based on the tenant and the same KVMs 616, 646 may be maintained for the same tenants, but the KVMs 616, 646 may be rebuilt when the tenancy changes due to a new tenant.

In one configuration, the first and second edge devices 612, 642 may operate KVM-based worker managers 614, 644 that generate the KVMs 616, 646 to run the applications 618, 648 for disparate customers. The KVM-based worker managers 614, 644 may operate to manage the execution of the applications 618, 648, as opposed to a container-based worker manager, as in previous configurations. The KVM-based worker managers 614, 644 (or application or process executor) may spawn new VM (virtual machine) instances for the applications 618, 648 and potentially reuse VM instances to improve efficiency.

In one configuration, an application 618 may be running on a KVM 616 of the first edge device 612, and the application 618 may execute on behalf of a mobile device. When the mobile device has been handed over from the first edge device 612 to the second edge device 642, the application 618 running on the first edge device 612 may migrate to the second edge device 642 as well. The application 618 may migrate to the second edge device 642 over a connection 630 between the first edge device 612 and the second edge device 642. In this example, the application running on the KVM 616 of the first edge device 612 may be migrated to a KVM 646 running on the second edge device 642. The KVM 646 running on the second edge device 642 may be pre-initialized when the mobile device is handed over from the first edge device 612 to the second edge device 642. In this example, the KVMs 616, 646 themselves may not move between the first and second edge devices 612, 642, but rather the applications 618, 648 may be moved between the KVMs 616, 646 being managed by the first and second edge devices 612, 642.

Figure 7:
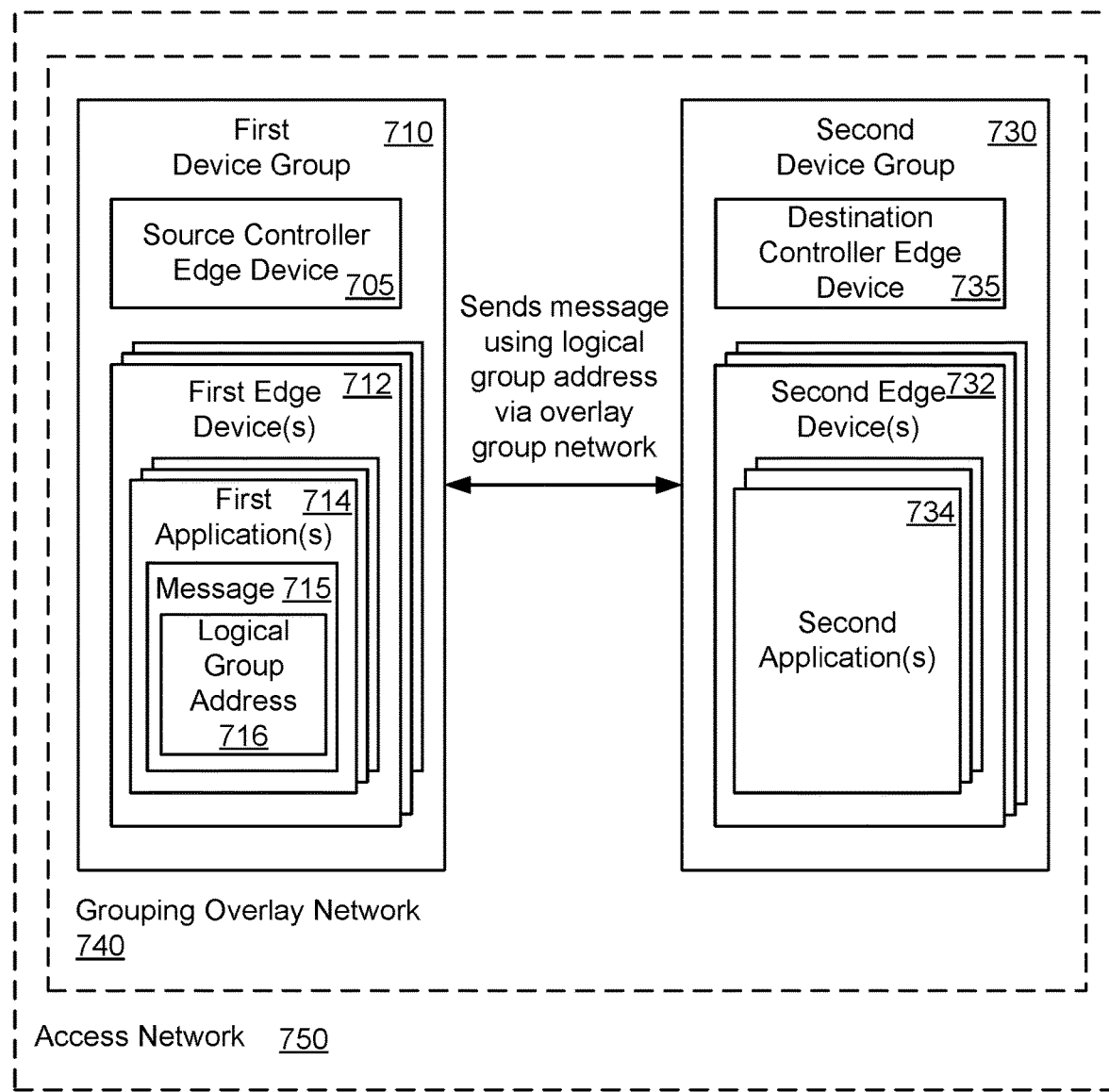
FIG. 7 illustrates a system and related operations for communicating messages between a first device group and a second device group using a logical group address via a grouping overlay network according to an example of the present technology.

FIG. 7 illustrates an exemplary system and related operations for communicating message(s) 715 between a first device group 710 and a second device group 730 using a logical group address 716 via a grouping overlay network 740. The grouping overlay network 740 may be an overlay to an access network 750. The first device group 710 may include a source controller edge device 705 and a plurality of edge devices including a first edge device 712 that executes a first application 714, and the second device group 730 may include a destination controller edge device 735 and a plurality of edge devices including a second edge device 732 that executes a second application 734. The first device group 710 and the second device group 730 may each include at least one edge device. In other words, the first device group 710 and the second device group 730 can each include a group or cluster of edge devices. In certain situations, the first application 714 running on the first device group 710 may wish to communicate with the second application 734 running on the second device group 730 to share information. The first application 714 and the second application 734 may be separate applications across the first and second device groups 710, 730, or separate instances of a same type of enterprise application across the first and second device groups 710, 730. In these situations, messages 715 from the first device group 710 may be sent to the second device group 730 using the logical group address 716 that identifies the second device group 730 as being a recipient of the messages 715, or vice versa.

In one example, the first device group 710 may send a message 715 to the second device group 730 over the grouping overlay network 740, which may overlay a defined network topology that is used to connect the first device group 710 and the second device group 730. In other words, the grouping overlay network 740 may be an overlay to a physical infrastructure or substrate network that connects the first device group 710 and the second device group 730 in the access network 750. The defined network topology used to connect the first device group 710 and the second device group 730 may include a hub-and-spoke network topology, a ring network topology, a tree network topology, a daisy chain network topology, etc. In one example, the defined network topology may include a connection between the first device group 710 and the second device group 730. The connection may include a bridge device that enables communication between the first device group 710 and the second device group 730, or the connection may include a VPN connection that enables communication between the first device group 710 and the second device group 730.

In one example, messages 715 may be routed or sent between the first and second device groups 710, 730 in the access network 750 using the logical group address 716. In this example, the first device group 710 may have a direct connection to the second device group 730 in the access network 750. The logical group address 716 may be associated with a specific message 715, and the logical group address 716 may identify a specific device group that is to receive the associated message 715. The logical group address 716 may also identify an edge device that is included in the device group and an application that is being executed on the edge device. The logical group address 716 may be a higher layer identifier that enables applications executing at device groups to communicate with other applications executing at other device groups.

For example, the first application 714 running on a first device of the first device group 710 may generate a message 715. The message 715 may be sent from the first device group 710 to the source controller edge device 705 in the first device group 710. The source controller edge device 705 may identify a logical group address 716 that identifies the second device group 730 as being an intended target of the message 715. The source controller edge device 705 in the first device group 710 may send the message 715 to the destination controller edge device 735 in the second device group 730 over the grouping overlay network 740 based on the logical group address 716. The destination controller edge device 735 in the second device group 730 may direct the message 715 to the second application 734 executing on the second edge device 732 of the second device group 730 based on the logical group address 716.

In an alternative example, the first application 714 at the first device group 710 may generate a message 715 with a logical group address 716 that identifies the second device group 730 as being an intended target of the message 715. The logical group address 716 may further identify the second application 734 executing at the second device group 730 as being an intended target of the message 715. In this example, the message 715 may be sent from the first application 714 at the first device group 710 to the source controller edge device 705 in the first device group 710. The source controller edge device 705 in the first device group 710 may send the message 715 to the destination controller edge device 735 in the second device group 730 over the grouping overlay network 740 based on the logical group address 716. The message 715 may be received at the destination controller edge device 735 in the second device group 730, and then the message 715 may be directed to the second application 734 executing on the second edge device 732 of the second device group 730 based on the logical group address 716.

In one example, a plurality of device groups in the access network 750 may be connected in a tree manner in accordance with the grouping overlay network 740. In another example, a plurality of device groups in the access network 750 may be connected in a hub-and-spoke manner in accordance with the grouping overlay network 740, in which one device group acts as a hub and the other device groups act as the spokes. In yet another example, a plurality of device groups in the access network 750 may be connected in a mesh manner in accordance with the grouping overlay network 740, in which each device group in the plurality of device groups may be connected to other device groups in the plurality of device groups. Regardless of the mechanism used to connect the device groups when forming the grouping overlay network 740, a connected graph may be formed in which vertices represent a device group and edges represent a device group-to-device group communication channel.

Figure 8:
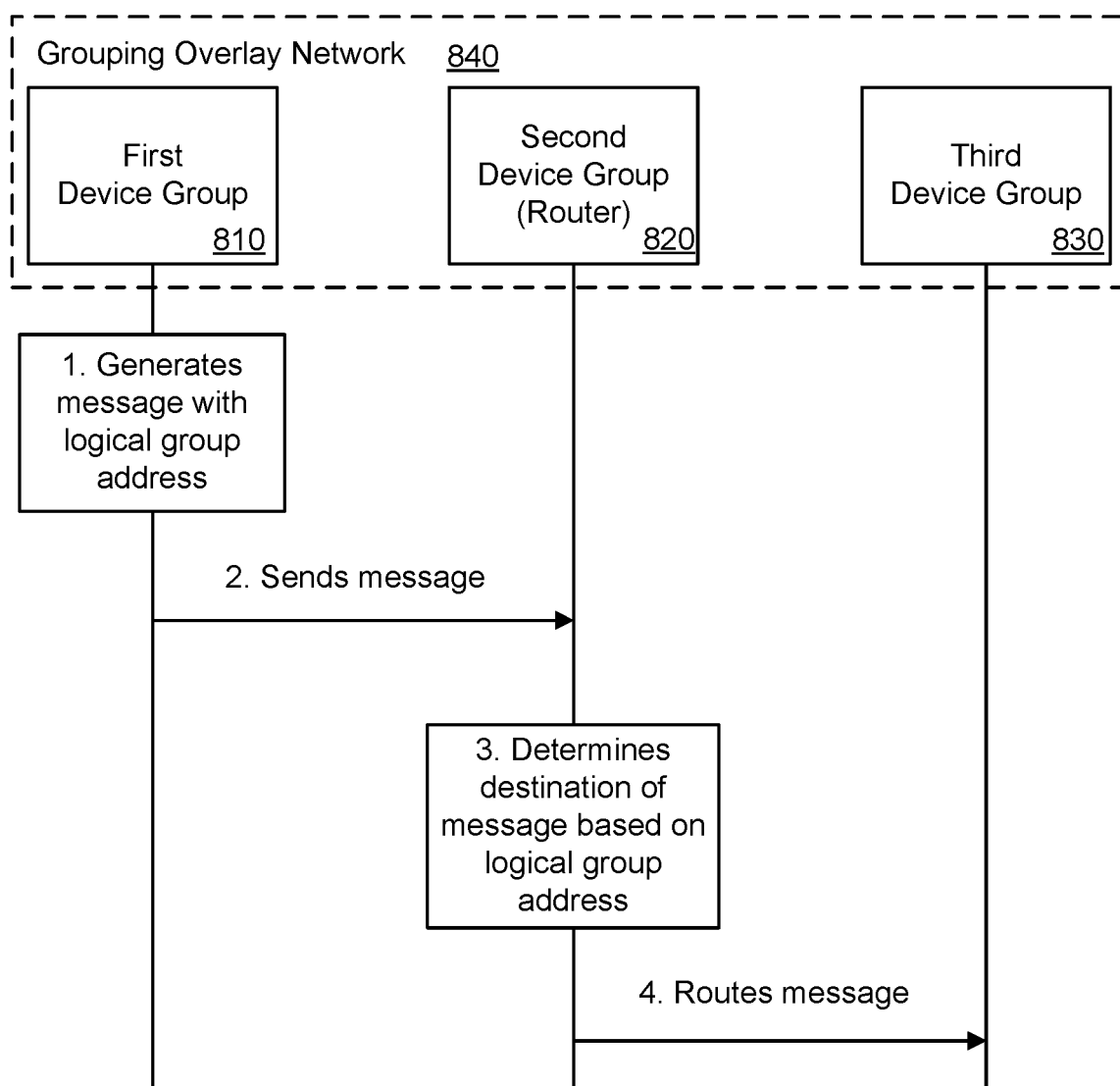
FIG. 8 illustrates a system and related operations for routing messages between a first device group and a third device group via a second device group in a grouping overlay network using a logical group address according to an example of the present technology.

FIG. 8 illustrates an exemplary system and related operations for routing messages between controller edge devices of a first device group 810 and a third device group 830 via a second device group 820 in a grouping overlay network 840 using a logical group address. The second device group 820 may act as a router to route messages between the first device group 810 and the third device group 830. For example, in a first step, the first device group 810 may generate a message with a corresponding logical group address that identifies an intended recipient of the message (i.e., a specific device group that is to receive the message). In a second step, the first device group 810 may send the message to the second device group 820 that acts as the router in the grouping overlay network 840. The second device group 820 may receive the message and determine the intended recipient of the message based on the logical group address. In this example, the second device group 820 may determine that the intended recipient of the message is the third device group 830 based on the logical group address. In a fourth step, the second device group 820 may route the message to the third device group 830. In this example, the second device group 820 may send the message to the third device group 830 on behalf of the first device group 810 when the first device group 810 does not have direct connectivity to the third device group 830.

In an alternative configuration, the grouping overlay network 840 may be a fully connected network, and each of the first device group 810, the second device group 820 and the third device group 830 may function as a router to route messages to another device group.

Figure 9:
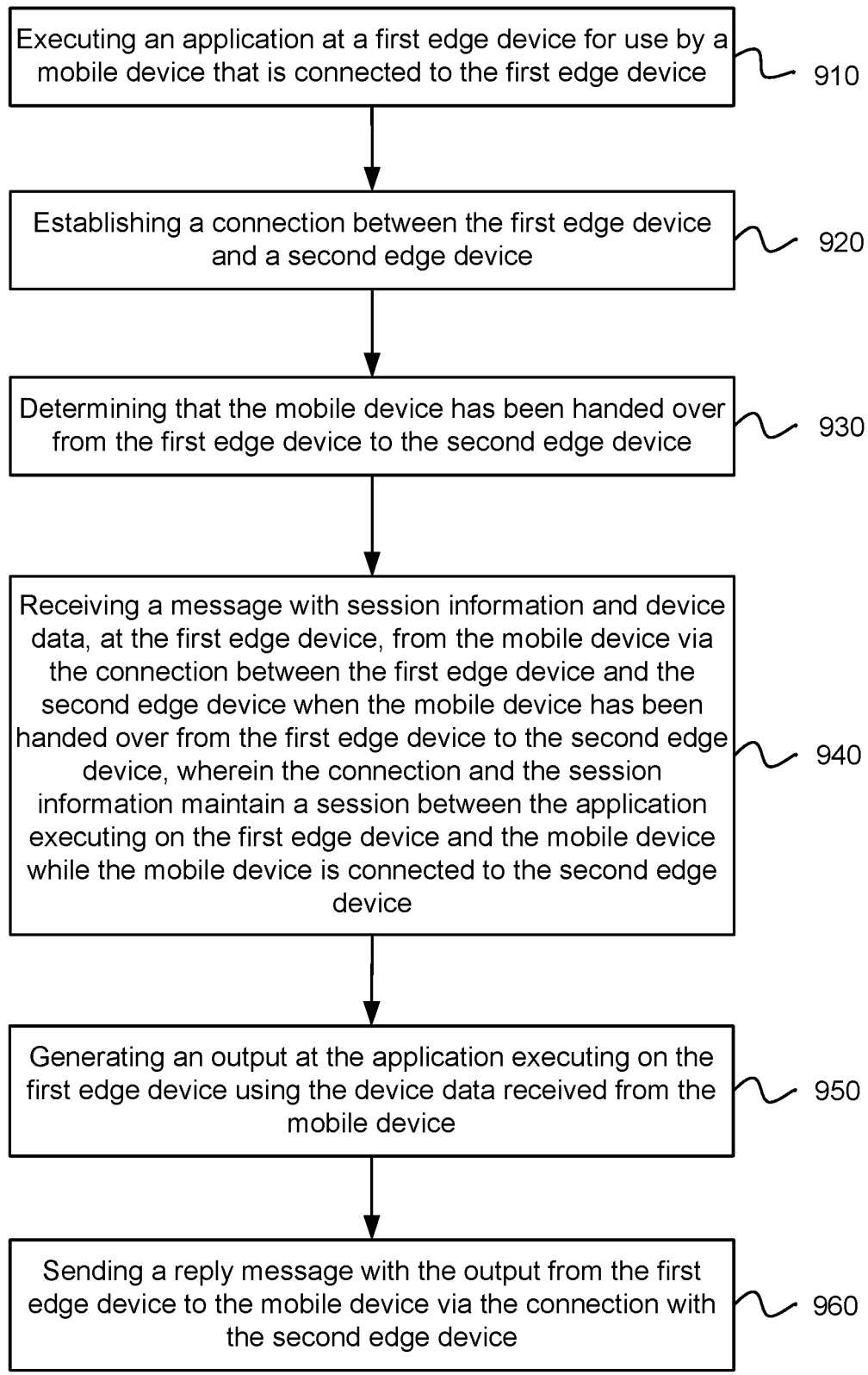
FIG. 9 is a flowchart of an example method for migrating a mobile device from a first edge device to a second edge device and communicating messages between the mobile device and the first edge device via the second edge device.

FIG. 9 illustrates an example of a method for migrating a mobile device from a first edge device to a second edge device and communicating messages between the mobile device and the first edge device via the second edge device. An application may be executed at the first edge device on behalf of the mobile device that is connected to the first edge device, as in block 910. The first edge device and the second edge device may be a base station, a wireless access point, a network hub, a traffic aggregation device or a central office. In addition, the first edge device may be included in a first device group and the second edge device may be included in a second device group.

A connection may be established between the first edge device and a second edge device, as in block 920. In one example, the connection may include a bridge device between the first edge device and the second edge device, and the bridge device may relay messages between the first edge device and the second edge device. In an alternative example, the connection may include a virtual private network (VPN) tunnel that enables the communication of messages between the first edge device and the second edge device. The messages communicated between the first edge device and the second edge device via the connection may include Message Queuing Telemetry (MQTT) messages or Real Time Streaming Protocol (RTSP) messages.

The first edge device may determine that the mobile device has been handed over from the first edge device to the second edge device, as in block 930. For example, when the mobile device moves from an area of the first edge device to an area of the second edge device, a connection with the mobile device may be migrated from the first edge device to the second edge device using a handover procedure.

In one example, the application executing on the first edge device may not move and may continue to execute on the first edge device when the mobile device has been handed over from the first edge device to the second edge device.

A message with session information and device data may be received at the first edge device from the mobile device via the connection with the second edge device, as in block 940. The message may be received at the first edge device via the connection when the mobile device has been handed over from the first edge device to the second edge device, and the connection and the session information may maintain a session between the application executing on the first edge device and the mobile device while the mobile device is connected to the second edge device. An application session may be maintained during handover of the mobile device by replicating and/or migrating a session state from the first edge device to the second edge device. The mobile device may send the device data to the second edge device, and the second edge device may send the message that includes the device data to the first edge device via the connection between the first edge device and the second edge device.

An output may be generated at the application executing on the first edge device using the device data received from the mobile device, as in block 950. In other words, the first edge device may receive the device data from the second edge device, and input the device data to the application executing at the first edge device and generate the output.

A reply message with the output may be sent from the first edge device to the mobile device via the connection with the second edge device, as in block 960. For example, the first edge device may send the reply message with the output to the second edge device, and the second edge device may forward the reply message with the output to the mobile device. As a result, the mobile device may communicate with the application executing on the first edge device via the second edge device, even after the mobile device has been handed over from the first edge device to the second edge device.

Figure 10:
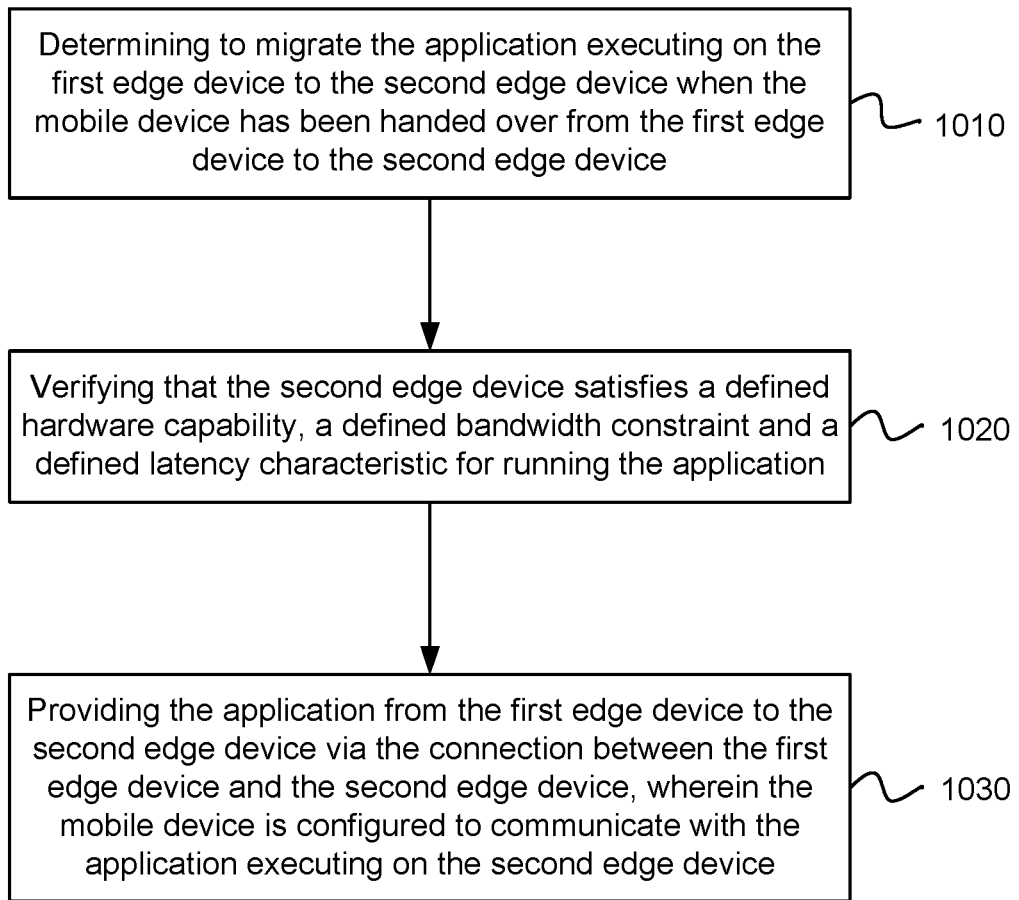
FIG. 10 is a flowchart of an example method for migrating an application from a first edge device to a second edge device when a mobile device has been handed over from the first edge device to the second edge device.

FIG. 10 illustrates an example of a method for migrating an application from a first edge device to a second edge device when a mobile device has been handed over from the first edge device to the second edge device. The first edge device may determine to migrate the application executing on the first edge device for the mobile device to the second edge device when the mobile device has been handed over from the first edge device to the second edge device, as in block 1010. For example, when the mobile device moves from a location of the first edge device to a location of the second edge device, the first edge device may determine to move the application to the second edge device. In addition, the application may be migrated from the first edge device to the second edge device when migration of the application is permitted by a control policy. Permissions in the control policy may be verified prior to migration of the application from the first edge device to the second edge device. For example, a video surveillance application may be permitted in some geographic areas but may not be permitted in other geographic areas based on a control policy associated with the video surveillance application.

The first edge device may verify that the second edge device satisfies a defined hardware capability, a defined bandwidth constraint and a defined network latency characteristic for running the application, as in block 1020. In one example, in addition to the movement of the mobile device from the first edge device to the second edge device, the first edge device may determine whether or not to migrate the application based on a performance level of the application, a resource utilization of the application, a cost of migrating the application or a service level agreement (SLA).

The first edge device may provide the application to the second edge device via the connection between the first edge device and the second edge device, as in block 1030. After the application has moved to the second edge device, the application may begin executing on the second edge device. The mobile device may communicate with the application that is executing on the second edge device. At this point, the mobile device may cease communication with the first edge device.

Figure 11:
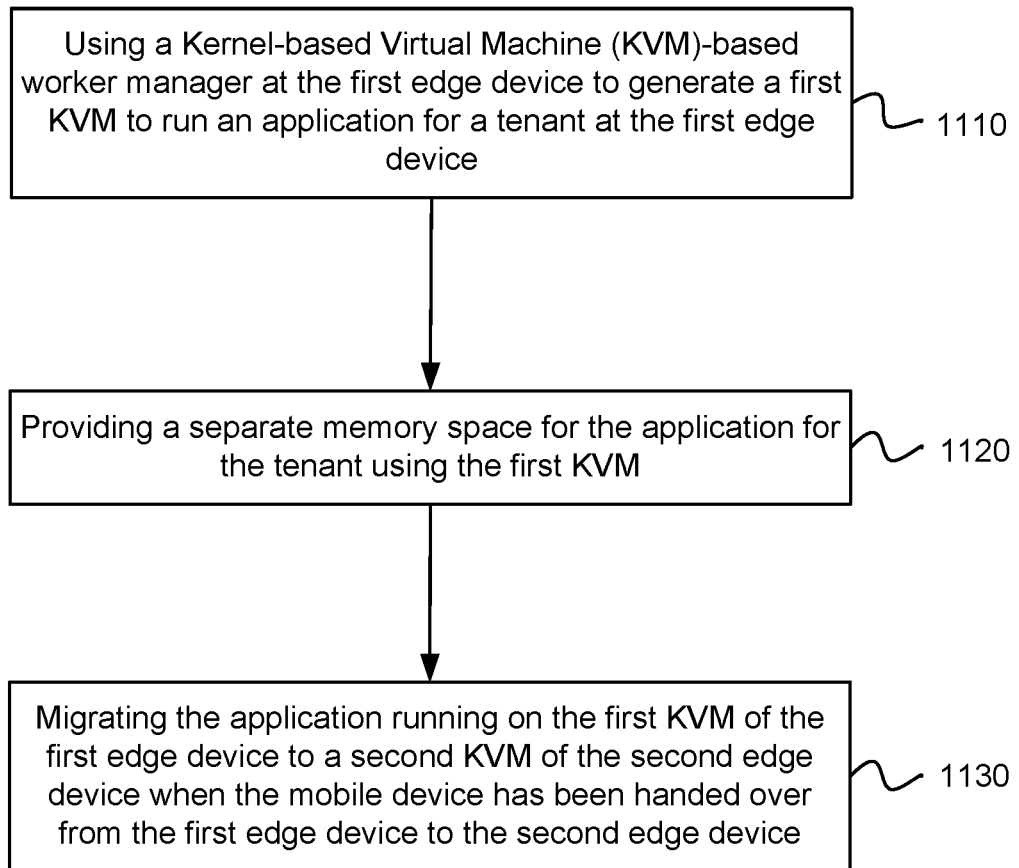
FIG. 11 is a flowchart of an example method for using kernel-based virtual machines (KVMs) to support multi-tenancy and disparate types of applications.

FIG. 11 illustrates an example of a method for using kernel-based virtual machines (KVMs) to support multi-tenancy and disparate types of applications. A first edge device may use a KVM-based worker manager to generate a first KVM to run an application for a tenant at the first edge device, as in block 1110. The application may include a third party application. In one example, one KVM may be generated per application or tenant at the first edge device.

The first KVM may provide a separate memory space for the application for the tenant, as in block 1120. The KVM-based worker manager may generate the first KVM to run the plurality of applications for the multiple tenants at the first edge device to provide a defined level of isolation and data privacy between each of the multiple tenants that are using the first edge device.

The application running on the first KVM of the first edge device may be migrated to a second KVM of the second edge device when the mobile device has been handed over from the first edge device to the second edge device, as in block 1130. For example, when the mobile device moves from a location of the first edge device to a location of the second edge device, the application may be migrated from the first KVM to the second KVM.

Figure 12:
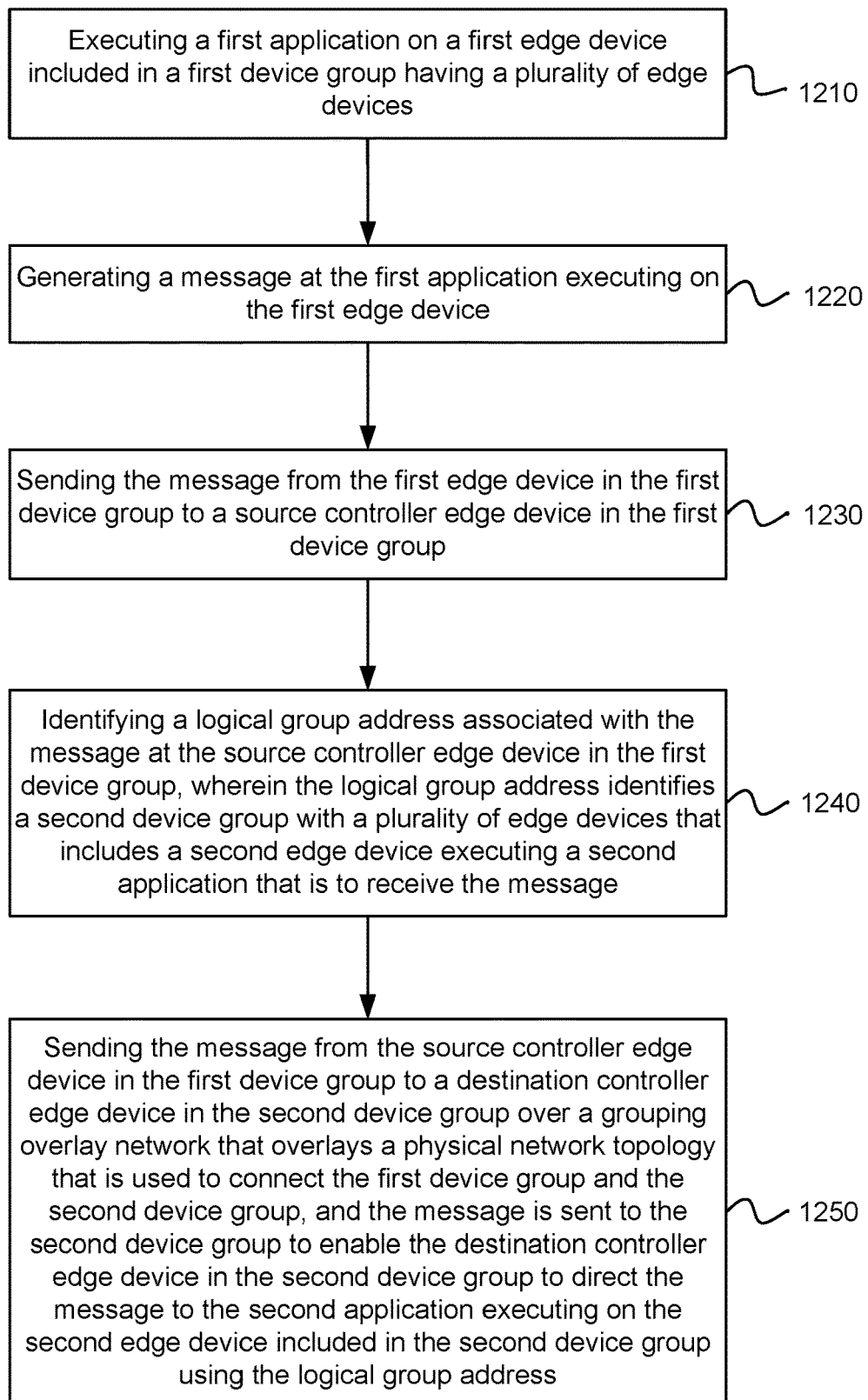
FIG. 12 is a flowchart of an example method for communicating messages between a first device group and a second device group using a logical group address via a grouping overlay network.

FIG. 12 illustrates an example of a method for communicating messages between a first device group and a second device group using a logical group address via a grouping overlay network. The first device group may include a source controller edge device and at least one edge device, and the second device group may include a destination controller edge device and at least one edge device. A first application may be executed on a first edge device included in a first device group, as in block 1210. The first application may be executed for a mobile device that is connected to the first edge device.

A message may be generated at the first application, as in block 1220. For example, the execution of the first application may result in an output of the message. The message may be generated using session information, device data, etc. from the mobile device.

The message may be sent from the first edge device in the first device group to source the controller edge device in the first device group, as in block 1230. In other words, the message may be sent from the first application executing on the first edge device to the source controller edge device within the first device group.

A logical group address associated with the message may be identified at the source controller edge device in the first device group, as in block 1240. The logical group address may identify a second device group that includes a second edge device executing a second application that is to receive the message. In other words, the logical group address may include sub-components to identify each of the second application, the second edge device and the second device group. For example, the logical group address may include a first sub-component to identify the second device group, a second sub-component to identify the second edge device, and a third sub-component to identify the second application. In one example, the first application and the second application may be separate applications across edge devices or separate instances of an enterprise application.

The message may be sent from the source controller edge device in the first device group to a destination controller edge device in the second device group over a grouping overlay network between the first device group and the second device group, as in block 1250. The message may be directed from the destination controller edge device in the second device group to the second application executing on the second edge device included in the second device group using the logical group address. The grouping overlay network may be an overlay to a physical network topology that is used to connect the first device group and the second group. For example, the physical network may be an IP (internet protocol) network. The defined network topology may include a bridge device between the first device group and the second device group, or the defined network topology may include a virtual private network (VPN) connection between the first device group and the second device group.

In one configuration, the first device group may function as a routing node to route messages to an appropriate destination. For example, the source controller edge device in the first edge device of the first device group may receive a second message from the second application. The source controller edge device in the first edge device may identify a second logical address associated with the second message, and the second logical address may identify a third application executing on a third edge device of a third device group that is to receive the second message. The source controller edge device in the first edge device may route the second message to a destination controller edge device in the third device group over the overlay network using the second logical address, and the destination controller edge device in the third device group may direct the second message to the third application executing on the third edge device in the third device group. The second message may be routed from the first device group to the third device group on behalf of the second device group when the second device group does not have connectivity to the third device group.

Figure 13:
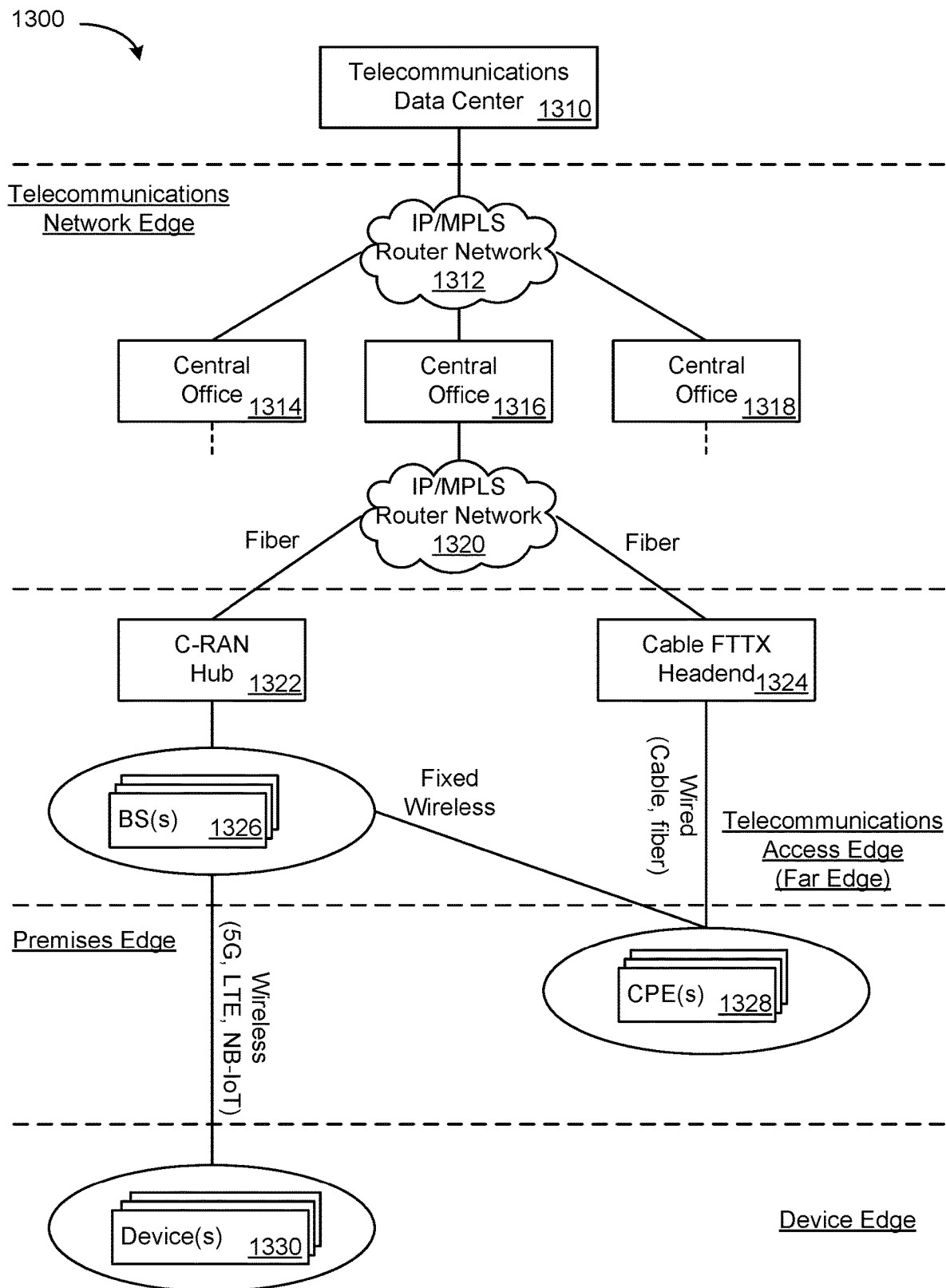
FIG. 13 is a diagram of a telecommunications network according to an example of the present technology.

FIG. 13 illustrates an example of a telecommunications network 1300. The telecommunications network 1300 may support device mobility (e.g., devices 1330 may migrate between separate base stations 1326), application session continuity when devices 1330 migrate between separate base stations 1326, application migration along with devices 1330 that migrate between separate base stations 1326, group messaging via a group overlay network, etc. as described earlier with respect to FIGS. 1-12.

The telecommunications network 1300 may include a telecommunications data center 1310. The telecommunications network 1300 may further include a telecommunications network edge, a telecommunications access edge (or far edge), a premises edge and/or a device edge. The telecommunications data center 1310 may be connected to an Internet Protocol (IP) or Multiprotocol Label Switching (MPLS) router network 1312 in the telecommunications network edge. The IP/MPLS router network 1312 may be connected to one or more central office(s) 1314, 1316, 1318 in the telecommunications network edge, which in turn may be connected to a second IP/MPLS router network 1320 in the telecommunications network edge.

In one example, the second IP/MPLS router network 1320 in the telecommunications network edge may be connected to a centralized radio access network (C-RAN) hub 1322 and/or a cable fiber to premises (FTTX) headend 1324 in the telecommunications access edge (or far edge) via fiber connection(s). The C-RAN hub 1322 may be connected to one or more base stations (BS) 1326 in the telecommunications access edge (or far edge). The cable FTTX headend 1324 may be connected to one or more customer premises equipment (CPE) 1328 in the premises edge via a wired connection (e.g., a cable or fiber connection). The CPE(s) 1328 in the premises edge may be further connected to the BS(s) 1326 in the telecommunications access edge (or far edge) via a fixed wireless protocol, such as a Fifth Generation (5G) wireless communication protocol. In addition, the BS(s) 1326 in the telecommunications access edge (or far edge) may be connected to device(s) 1330 (e.g., mobile devices) in the device edge via a wireless protocol. Non-limiting examples of the wireless protocol may include, but are not limited to, 5G, Long Term Evolution (LTE), Narrowband Internet of Things (NB-IoT), etc.

Figure 14:
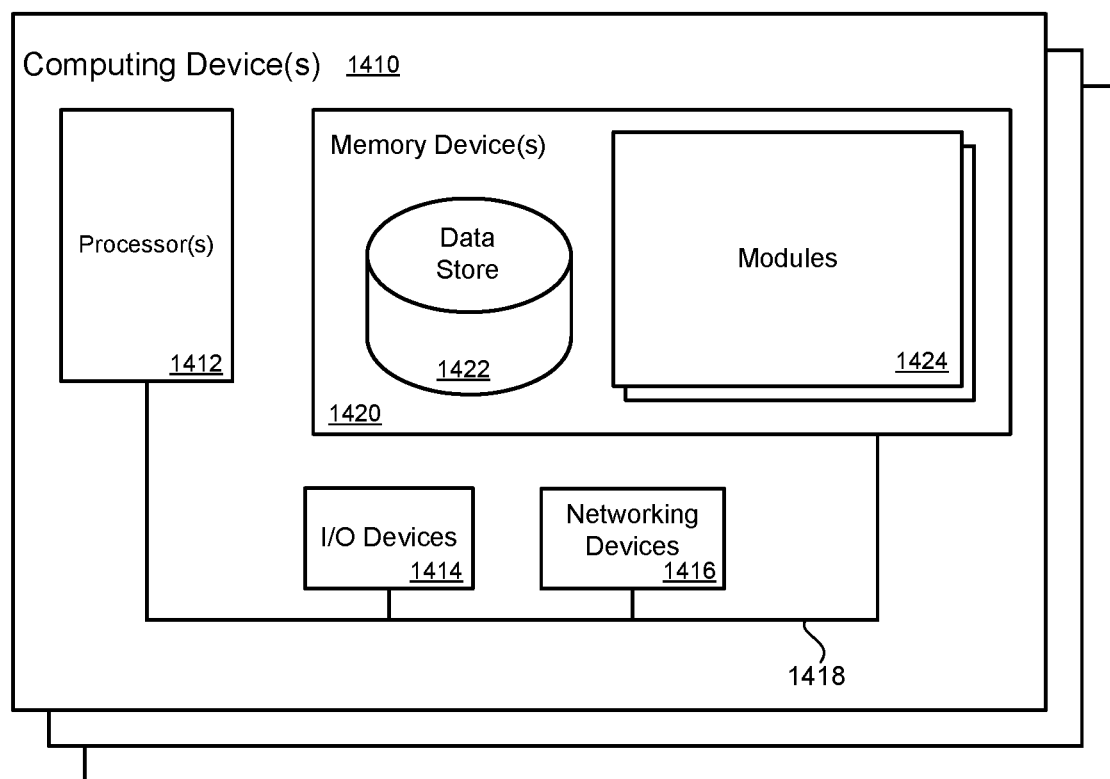
FIG. 14 is a block diagram that provides an example illustration of a computing device that may be employed in the present technology.

FIG. 14 illustrates a computing device 1410 on which modules or code components of this technology may execute. A computing device 1410 is illustrated on which a high level example of the technology may be executed. The computing device 1410 may include one or more processors 1412 that are in communication with memory devices 1420. The computing device may include a local communication interface 1418 for the components in the computing device. For example, the local communication interface may be a local data bus and/or any related address or control busses as may be desired.

The memory device 1420 may contain modules 1424 or code components that are executable by the processor(s) 1412 and data for the modules 1424. The modules 1424 may execute the functions described earlier. A data store 1422 may also be located in the memory device 1420 for storing data related to the modules 1424 and other applications along with an operating system that is executable by the processor(s) 1412.

Other applications may also be stored in the memory device 1420 and may be executable by the processor(s) 1412. Components or modules discussed in this description that may be implemented in the form of software using high programming level languages that are compiled, interpreted or executed using a hybrid of the methods.

The computing device may also have access to I/O (input/output) devices 1414 that are usable by the computing devices. An example of an I/O device is a display screen that is available to display output from the computing devices. Other known I/O device may be used with the computing device as desired. Networking devices 1416 and similar communication devices may be included in the computing device. The networking devices 1416 may be wired or wireless networking devices that connect to the internet, a LAN, WAN, or other computing network.

The components or modules that are shown as being stored in the memory device 1420 may be executed by the processor 1412. The term "executable" may mean a program file that is in a form that may be executed by a processor 1412. For example, a program in a higher level language may be compiled into machine code in a format that may be loaded into a random access portion of the memory device 1420 and executed by the processor 1412, or source code may be loaded by another executable program and interpreted to generate instructions in a random access portion of the memory to be executed by a processor. The executable program may be stored in any portion or component of the memory device 1420. For example, the memory device 1420 may be random access memory (RAM), read only memory (ROM), flash memory, a solid state drive, memory card, a hard drive, optical disk, floppy disk, magnetic tape, or any other memory components.

The processor 1412 may represent multiple processors and the memory 1420 may represent multiple memory units that operate in parallel to the processing circuits. This may provide parallel processing channels for the processes and data in the system. The local interface 1418 may be used as a network to facilitate communication between any of the multiple processors and multiple memories. The local interface 1418 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A non-transitory machine readable storage medium comprising instructions that, as a result of being executed by one or more processors, cause the one or more processors to:
   execute a first application on a first edge device included in a first device group, the first device group including a plurality of edge devices;
   generate a message at the first application executing on the first edge device;
   send the message from the first edge device in the first device group to a source controller edge device in the first device group;
   identify a logical group address associated with the message at the source controller edge device in the first device group, wherein the logical group address identifies a second device group with a plurality of edge devices that includes a second edge device executing a second application that is to receive the message;
   send the message from the source controller edge device in the first device group to a destination controller edge device in the second device group over a grouping overlay network that overlays a physical network topology used to connect the first device group and the second device group, wherein the destination controller edge device sends the message to the second application executing on the second edge device based at least in part on the logical group address.

2. The non-transitory machine readable storage medium of claim 1, wherein the instructions further cause the one or more processors to:
   receive, at the source controller edge device in the first device group, a second message from the second device group;
   identify a second logical group address associated with the second message, wherein the second logical group address identifies a third device group that is to receive the second message, and the first device group acts as a router for the second message using the second logical group address; and
   route the second message from the source controller edge device in the first device group to a destination controller edge device in the third device group over the overlay grouping network, wherein the second message is directed to a third application executing on a third edge device included in the third device group using the logical group address.

3. The non-transitory machine readable storage medium of claim 2, wherein the second message is routed from the first device group to the third device group on behalf of the second device group when the second device group does not maintain connectivity to the third device group.

4. The non-transitory machine readable storage medium of claim 1, wherein the first edge device and the second edge device are selected from a group consisting of: a base station, a wireless access point, a computing hub, a traffic aggregation device and a central office.

5. The non-transitory machine readable storage medium of claim 1, wherein the first application and the second application are separate applications running on the first edge device and the second edge device.

6. A method, comprising:
   generating a message at a first edge device in a first device group, wherein the first device group includes a plurality of edge devices including the first edge device that is configured to execute a first process;
   identifying a logical group address associated with the message at the first edge device of the first device group, wherein the logical group address identifies a second device group that is to receive the message, and the second device group includes a plurality of edge devices including a second edge device that is configured to execute a second process;

sending the message with the logical group address from the first edge device in the first device group to a source controller edge device in the first device group; and sending the message from the source controller edge device in the first device group to a destination controller edge device in the second device group over an overlay grouping network between the first device group and the second device group based at least in part on the logical group address associated with the message identifying an application executing on the second edge device.

7. The method of claim 6, wherein the overlay grouping network is an overlay to a defined network topology that is used to logically connect the first device group and the second device group.

8. The method of claim 6, further comprising sending the message from the first process executing on the first edge device included in the first device group to the second process executing on the second edge device included in the second device group using the logical group address.

9. The method of claim 6, wherein the overlay grouping network includes one or more bridge devices between the first device group and the second device group that enables communication between the first device group and the second device group.

10. The method of claim 6, wherein the overlay grouping network includes a virtual private network (VPN) connection between the first device group and the second device group that enables communication between the first device group and the second device group.

11. The method of claim 6, further comprising:
receiving, at the source controller edge device in the first device group, a second message from the second device group;
identifying a second logical group address associated with the second message, wherein the second logical group address identifies a third device group that is to receive the second message, and the first device group acts as a router for the second message using the second logical group address; and
routing the second message from the source controller edge device in the first device group to a destination controller edge device in the third device group over the overlay grouping network, wherein the second message is directed to a third process executing on a third edge device included in the third device group using the logical group address.

12. The method of claim 11, wherein the second message is routed from the first device group to the third device group on behalf of the second device group when the second device group does not maintain network connectivity to the third device group.

13. The method of claim 6, wherein the first process and the second process are separate processes running on the first edge device and the second edge device, or separate instances of a same type of process running on the first edge device and the second edge device.

14. The method of claim 6, wherein the first edge device in the first device group and the second edge device in the second device group are selected from a group consisting of: a base station, a wireless access point, a computing hub, a traffic aggregation device and a central office.

15. A system, comprising:
at least one processor; and
at least one memory device including a data store to store a plurality of data and instructions that, when executed, cause the system to:
execute a first application at a first device group;
generate a message at the first application executing on the first device group;
identify a logical group address associated with the message that identifies a second device group that is to receive the message; and
communicate the message from the first application executing on the first device group via a source controller edge device to a destination controller edge device in the second device group over an overlay grouping network between the first device group and the second device group using the logical group address associated with the message, and the message is directed from the destination controller edge device in the second device group to a second application executing on the second device group.

16. The system of claim 15, wherein:
the first device group includes a first edge device that executes the first application; and
the second device group includes a second edge device that executes the second application.

17. The system of claim 15, wherein the plurality of data and instructions, when executed, cause the system to:
receive, at the source controller edge device in the first device group, a second message from the second device group;
identify a second logical group address associated with the second message; and route the second message from the source controller edge device in the first device
group to a destination controller edge device in a third device group over the overlay grouping network based on the second logical group address.

18. The system of claim 17, wherein the second message is routed from the first device group to the third device group on behalf of the second device group when the second device group does not maintain connectivity to the third device group.

19. The system of claim 15, wherein the overlay grouping network is an overlay to a physical network topology that is used to connect the first device group and the second device group.

20. The system of claim 15, wherein the first device group and the second device group include one or more edge devices that are selected from a group consisting of: a base station, a wireless access point, a computing hub, a traffic aggregation device and a central office.

* * * * *